United States Patent
Alcantara et al.

(10) Patent No.: US 6,406,034 B1
(45) Date of Patent: Jun. 18, 2002

(54) SHAFT JOINT SEAL HAVING WIPER

(75) Inventors: Avissai Alcantara, Chih (MX); Keith Allen Kozlowski, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/428,225

(22) Filed: Oct. 27, 1999

(51) Int. Cl.[7] .............................. F16J 3/00; F16L 57/00; F16L 55/10
(52) U.S. Cl. ..................... 277/634; 277/635; 277/549; 277/561; 285/23; 138/89; 138/90
(58) Field of Search ................................ 277/549, 551, 277/561, 634, 635, 636; 285/110, 23; 138/89, 90

(56) References Cited

U.S. PATENT DOCUMENTS

| | | | | |
|---|---|---|---|---|
| 3,104,681 A | * | 9/1963 | Gray, Jr. | |
| 3,574,312 A | * | 4/1971 | Miller | |
| 3,807,195 A | * | 4/1974 | Faulbecker | |
| 4,094,376 A | * | 6/1978 | Welschof | |
| 4,378,858 A | * | 4/1983 | Goft et al. | |
| 4,627,826 A | * | 12/1986 | Juziuk et al. | |
| 5,183,351 A | * | 2/1993 | Schneider | |
| 5,224,515 A | * | 7/1993 | Foster et al. | |
| 5,498,092 A | * | 3/1996 | Fellows | |
| 5,525,112 A | * | 6/1996 | Smith | |
| 5,605,337 A | * | 2/1997 | Puri | |
| 5,725,433 A | * | 3/1998 | Kudo et al. | |
| 5,886,294 A | * | 3/1999 | Scrimpshire et al. | |

* cited by examiner

Primary Examiner—Anthony Knight
Assistant Examiner—Vishal Patel
(74) Attorney, Agent, or Firm—Edmund P. Anderson

(57) ABSTRACT

A joint for a shaft assembly includes a housing fitted with a boot seal that encircles and seals about a stub end of a shaft extending into the housing. The boot seal has a collar-like neck portion whose inner surface is formed with an annular wiper rib. Prior to assembly with the shaft, a shipping plus is disposed in the neck of the seal to guard against the escape of grease and the ingress of contaminants. The wiper rib of the seal is operative to engage and wipe grease from the inserted shank of the shipping plug upon its removal to prevent the grease from accumulating in the neck region and impairing the performance of the seal.

4 Claims, 2 Drawing Sheets

SHAFT JOINT SEAL HAVING WIPER

TECHNICAL FIELD

This invention relates generally to shaft joints and particularly to the boot seals of such joints used to exclude contaminants from entering the joint housing in service.

RELATED PRIOR ART

Joints for torque-transmitting shafts, such as those mounted at the ends of a prop shaft of a motor vehicle typically include a joint housing having an open end that receives a stub end of the prop shaft. The end is closed by a boot seal fixed to the housing with a neck that surrounds and seals against the shaft for excluding contaminants such as dust, dirt, water, salt, road grime, and the like from entering the housing during service in order to protect the internal working components of the joint for damage.

In cases where the joint is to be pre-lubricated with grease and shipped elsewhere for assembly with the shaft, measures must be taken to contain the grease within the housing and to exclude contaminants from entering the housing during shipping. A common approach to protecting the joint during shipment has been to install a removable shipping plug into the open unoccupied neck of the seal. The shipping plug has a cylindrical shank corresponding in dimension to the stub end of the shaft which is inserted into the open neck. An enlarged head on the trailing end of the plug confronts the end of the neck to limit insertion and to help seal the opening. The shank is interior to a housing and comes into contact with the grease.

Once the joint arrives at its destination and is ready for assembly with the shaft, the shipping plug is removed. As the shank of the plug is withdrawn from the boot seal, it has a tendency to carry some of the grease along with it, causing unwanted grease to accumulate on the neck portion of the boot seal. The presence of such grease on the neck region is undesirable, as it can allow the neck portion to move axially along the shaft and/or twist on the shaft in service, impairing the sealing effectiveness of the boot seal. Accordingly, there is a need in the industry for a joint seal that is not prone to the accumulation of such grease on the neck region upon removal of the shipping plug to ensure superior performance of the seal in service.

SUMMARY OF THE INVENTION

A joint assembly according to the invention mountable on a rotatable torque-transmitting shaft comprises a joint housing have an open end, a boot seal fixed to the housing for sealing the open end having a neck portion with a generally cylindrical inner wall defining a passage terminating at a free open end of the neck portion for receiving a stub end of the shaft therein, and a shipping plug removably disposed within the passage for temporarily closing the passage prior to mounting the joint assembly on the shaft in order to contain grease within the housing and to exclude contaminants from entering the housing through the neck portion.

According to the invention, an annular wiper rib is provided on the inner wall of the neck portion in wiping engagement with the shipping plug. The wiper rib is operative to scrape grease from the shipping plug upon its removal from the neck portion thereby preventing the grease from passing into the neck portion beyond the wiper rib.

One advantage of the present invention is that the same plug configuration and installation/removal techniques can be used as before, while the subject wiper rib feature operates to remove the grease from the plug during its removal to keep the grease from contaminating the neck portion.

THE DRAWINGS

These and other advantages and features of the present invention will be more readily appreciated when considered in connection with the following detailed description and drawings, wherein.

DETAILED DESCRIPTION

Figure 1:
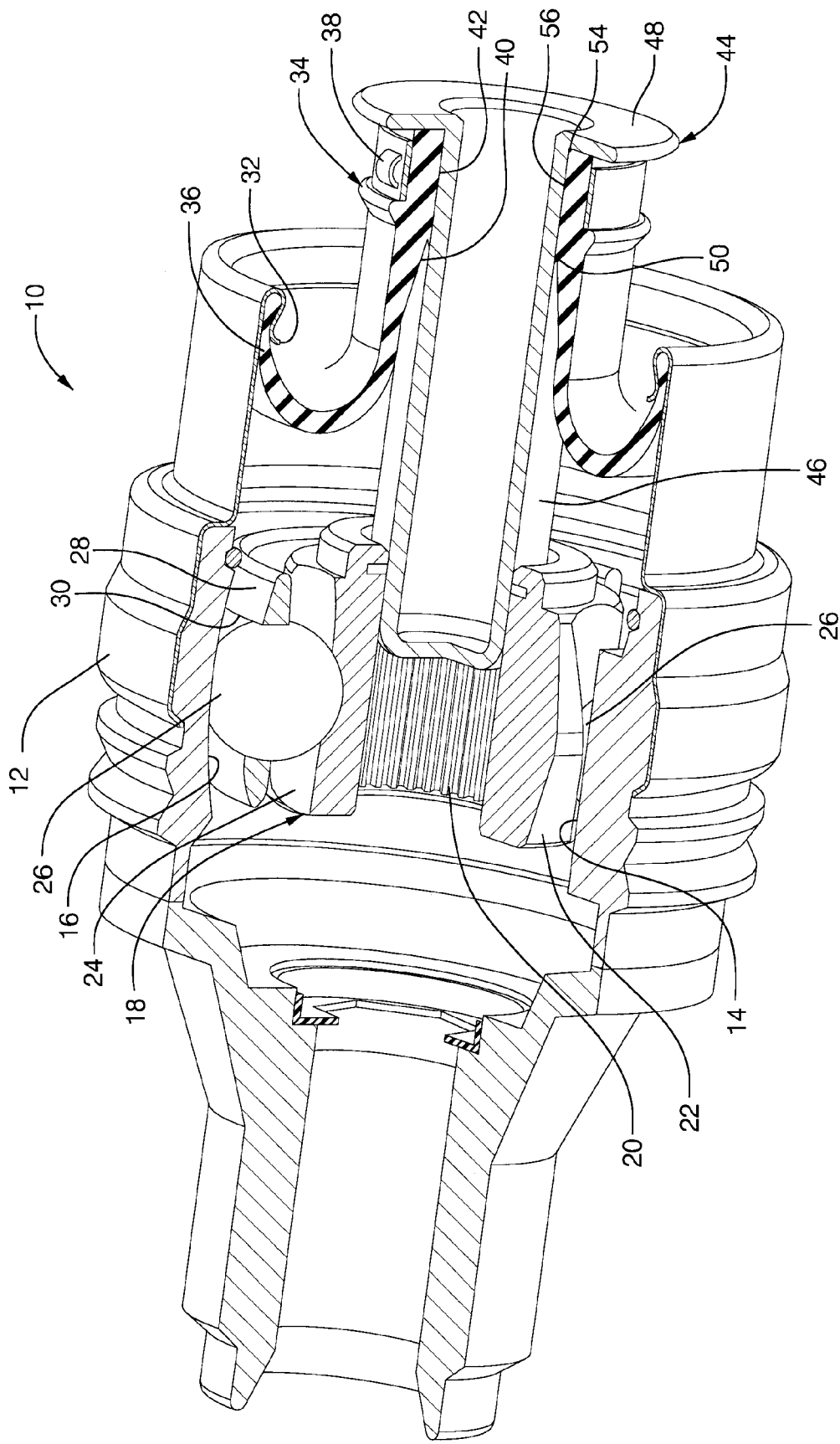
FIG. 1 is a perspective view, shown partly broken away, of a joint assembly according to the invention.

A joint assembly mountable on a rotatable torque-transmitting shaft (not shown) is indicated generally at 10 in FIG. 1 and comprises a generally cylindrical joint housing 12 having an inner surface 14 formed with a plurality of circumferentially spaced, longitudinally extending channels 16. Accommodated within the housing 12 is an inner race 18 having an inner splined bore 20 for engaging a splined stub end of the torque-transmitting shaft (not shown) on which the joint assembly 10 is to be mounted. An outer surface 22 of the race 18 is formed with a plurality of circumferentially spaced, longitudinally extending channels 24 that are aligned with the channels 16 of the housing 12 to define guide ways for a plurality of load-transmitting rolling elements, such as spherical balls 26. A cage 28 is provided between the inner race 18 and housing 12 and is formed with a plurality of circumferentially spaced ball pockets 30 in which the balls 26 are disposed. The inner race 18 and hence the shaft (not shown) is able to move angularly relative to the housing 10 as well as slide longitudinally relative thereto, as is conventional with such shaft joints.

The housing 12 is open at one longitudinal end 32 for receiving the stub end of the shaft (not shown) into the housing for mating engagement with the bore 20 of the inner race 18. The end 32 of the housing 12 is fitted with a boot seal 34 that is secured in sealed engagement with the housing 12 about an outer perimeter portion 36 thereof. The boot seal 34 includes a central collar or neck portion 38 having a generally cylindrical configuration extending longitudinally outwardly of the housing 12 for encircling and sealing about the shaft (not shown) in service in order to contain a lubricant, such as grease, within the housing 12 during service and to exclude any contaminants from entering the housing 12, such as dust, dirt, road grime, salt, water, etc. The neck portion 38 has an inner surface 40 that is generally cylindrical. By "generally cylindrical" it is meant that the inner surface 40 presents a collar-like configuration that extends along and encircles the shaft (not shown) during operation, but may or may not be truly cylindrical and may for example, have changes in diameter along its length. The inner surface 40 defines a passage 42 in the neck portion 38 for accommodating the stub end of the shaft (not shown).

The joint assembly 10 of FIG. 1 is shown with a removable shipping plug 44 disposed in the passage 42 of the neck portion 38. The plug 44 has a generally cylindrical body section or shank 46 that extends through the boot seal 34 and into the splined bore 20 of the inner race 18. The plug 44 has an enlarged head 48 at its opposite end which overlies and confronts the outer free end of the neck portion 38 to limit the insertion of the plug and to close and temporarily seal the passage 42, so as to contain the grease and exclude contaminants during shipping of the assembly 10. It will be appreciated that the inner most end region of the shank 46 is exposed to the grease within the housing 10.

Figure 2:
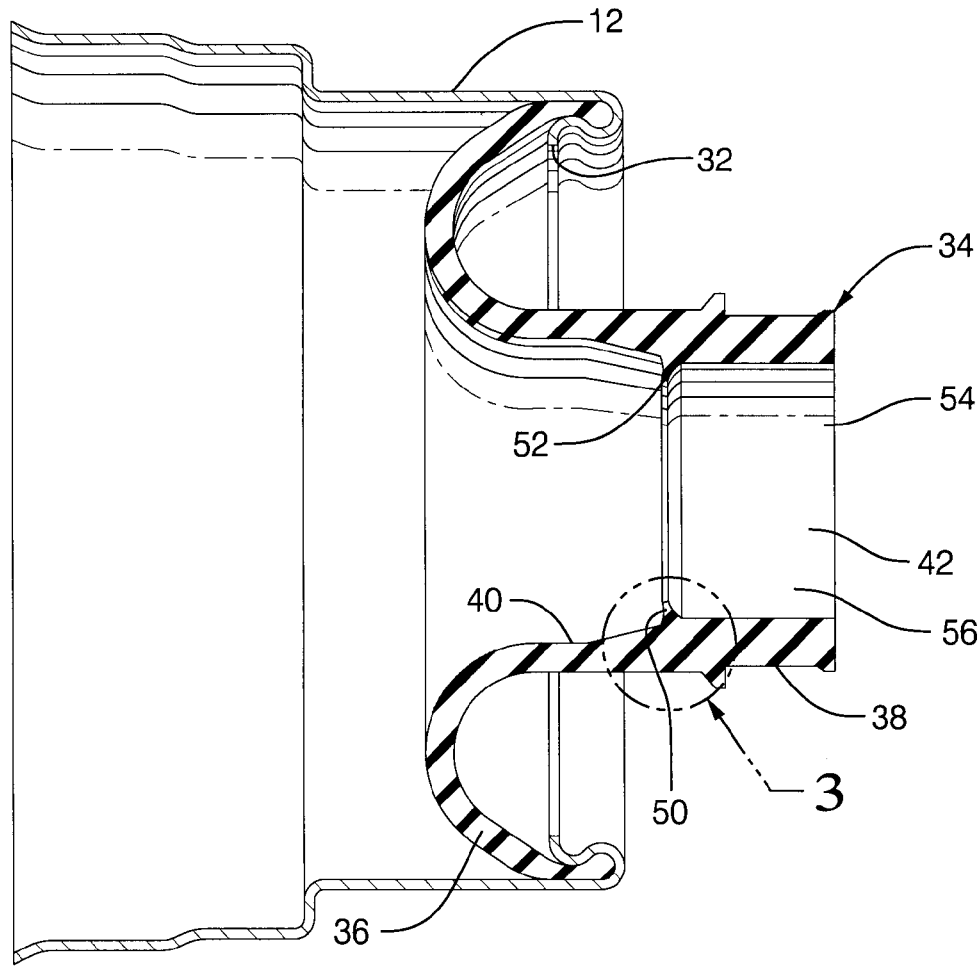
FIG. 2 is a longitudinal section view of the assembled housing and seal components.
Figure 3:
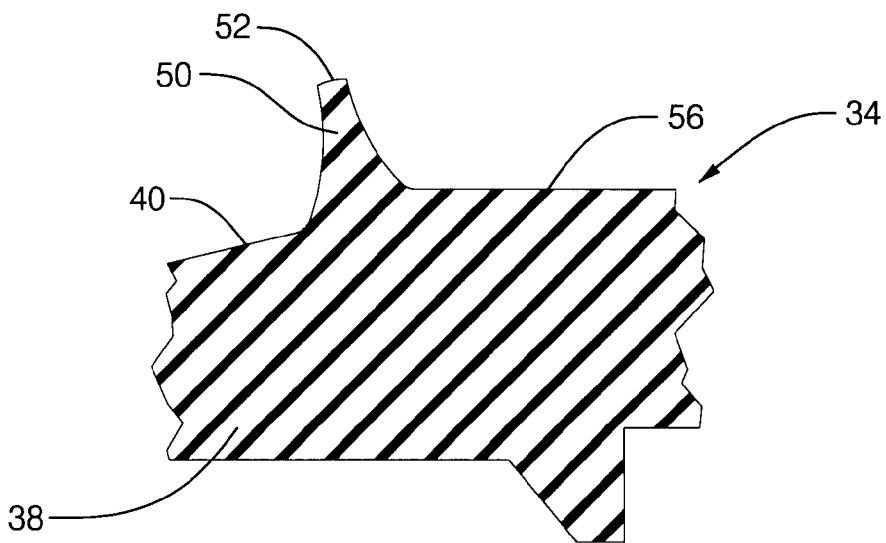
FIG. 3 is an enlarged fragmentary sectional view of the wiper rib feature of the seal.

In order to prevent the grease that collects on the shank 46 of the plug 44 from accumulating on the neck portion 38 of the seal 34 upon removing the plug from the passage 42, the neck portion 38 is formed with an annular wiper rib 50 disposed in wiping engagement with the outer surface of the shank 46. The wiper rib 50 is preferably formed as an integral one piece feature of the seal 34, and comprises a circumferentially continuous lip 52 projecting radially inwardly of the inner surface 40 of the neck portion 48 presenting a constricted or reduced diameter region of the neck portion 38 that constricts about the shank 46 of the plug 44. In its unstressed, free state as shown in FIGS. 2 and 3, the lip 52 is preferably angled or inclined longitudinally inwardly away from an open end 54 of the neck portion 38. The inward inclination reduces the insertion force of the plug and relatively increases the removal force to enhance the wiping action. Upon removing the shipping plug 44, the longitudinal outward movement of the shank 46 against the stationary wiper rib 50 causes any grease that is present on the shank 46 to be wiped by the rib 50 off the shank so as to be contained within the housing 12 and precluded from passing into the neck portion 38 beyond the wiper rib 50. As illustrated in the drawings, the wiper rib 50 is spaced longitudinally inward from the open end of the neck portion 38. As shown in FIG. 1, when the plug 44 or shaft (not shown) is installed, the elastically deformable sealing lip 50 deforms longitudinally inwardly of the open end 54 of the neck portion 38 and radially inwardly relative to the initial free unstressed state of the lip 50 to a stressed position in which the lip 50 lies flush with the inner surface 40 of the neck portion 38. As shown best in FIG. 2, an outer region 56 of the neck portion 38 adjacent the axially outward side of the wiper rib 50 has an inner surface diameter which is relatively smaller than the inner surface diameter of the neck portion on the opposite axially inner side of the wiper rib 50. The outer region 56 is disposed in running contact with the shaft (not shown) during operation, and it is this region that is to be kept free of grease.

The disclosed embodiment is representative of a presently preferred form of the invention, but is intended to be illustrative rather than definitive thereof. The invention is defined in the claims.

What is claimed is:

1. A joint assembly mountable on a rotatable torque-transmitting shaft comprising:

a joint housing having an open end;

a boot seal fixed to said housing for sealing said open end of said housing, said boot seal including a neck portion having a generally cylindrical inner wall surface extending longitudinally inwardly from an open free end of said neck portion to provide a passage for receiving a removable shipping plug prior to assembly with the shaft; and an annular wiper rib provided on said boot seal in longitudinally inwardly spaced relation to said open free end of said neck portion, said wiper rib having a circumferentially continuous elastically deformable sealing lip projecting radially inwardly of said generally cylindrical inner wall surface of said neck portion when said sealing lip is in a free state, said sealing lip being elastically deformable longitudinally inwardly and radially outwardly of said free state to a stressed position in which said sealing lip lies substantially flush with said generally cylindrical inner wall surface in response to inserting the shipping plug into said passage.

2. The assembly of claim 1 wherein said wiper rib is molded integrally with said inner wall of said neck portion and projects radially inwardly thereof.

3. The assembly of claim 1 wherein said annular sealing lip is inclined longitudinally inwardly away from said open end of said neck portion when in said relaxed state.

4. The assembly of claim 1 including an inner annular race disposed in said housing in radially spaced relation thereto, a plurality of circumferentially spaced load bearing balls supported between said inner race and said housing, and a ball cage disposed between said inner race and said housing and including a plurality of ball pockets in which said balls are disposed.

* * * * *